United States Patent
Richard et al.

(10) Patent No.: US 7,017,471 B2
(45) Date of Patent: Mar. 28, 2006

(54) PNEUMATIC BRAKE BOOSTER PROVIDED WITH A CONTROL ROD AND METHOD FOR MOUNTING SAME

(75) Inventors: Philippe Richard, Chelles (FR); Olivier Castello, Bondy (FR); Stéphane Lacroix, Tournan En Brie (FR); Cyril Divoux, Emerainville (FR)

(73) Assignee: Robert Bosch GmbH, Stuttgart (DE)

( * ) Notice: Subject to any disclaimer, the term of this patent is extended or adjusted under 35 U.S.C. 154(b) by 41 days.

(21) Appl. No.: 10/487,366

(22) PCT Filed: Jun. 19, 2002

(86) PCT No.: PCT/FR02/02117

§ 371 (c)(1),
(2), (4) Date: Feb. 20, 2004

(87) PCT Pub. No.: WO03/004923

PCT Pub. Date: Jan. 16, 2003

(65) Prior Publication Data

US 2004/0255777 A1    Dec. 23, 2004

(30) Foreign Application Priority Data

Jun. 21, 2001   (FR) ................................. 01 08306

(51) Int. Cl.
F15B 9/10      (2006.01)
F01B 29/00     (2006.01)

(52) U.S. Cl. ........................................................ 92/128
(58) Field of Classification Search .................. 92/128, 92/129; 91/376 R; 60/582
See application file for complete search history.

(56) References Cited

U.S. PATENT DOCUMENTS

| | | | | |
|---|---|---|---|---|
| 3,173,266 A | * | 3/1965 | Shutt | 92/169.1 |
| 4,453,747 A | * | 6/1984 | Bimba | 285/305 |
| 5,499,570 A | * | 3/1996 | Bergelin et al. | 92/128 |
| 5,964,140 A | * | 10/1999 | Guenther et al. | 92/128 |
| 6,470,791 B1 | * | 10/2002 | Welter et al. | 92/188 |
| 6,802,245 B1 | * | 10/2004 | Frey et al. | 92/129 |

FOREIGN PATENT DOCUMENTS

DE          19843316 A1 *   3/2000

* cited by examiner

Primary Examiner—Edward K. Look
Assistant Examiner—Michael Leslie
(74) Attorney, Agent, or Firm—Leo H. McCormick, Jr.; Warren Comstock; Sarah Taylor

(57) ABSTRACT

A method and structure for connecting a pneumatic booster (S) to a brake pedal (F) by nesting a second element (3) inside a second element (2) of a control rod (1). The second element (3) is held one inside the first element (2) by a spring clip (25) that is housed in a circular groove (26) of an adapter (5) to define an elastic attachment and allow for play to be taken up to stabilize the connection.

12 Claims, 2 Drawing Sheets

PNEUMATIC BRAKE BOOSTER PROVIDED WITH A CONTROL ROD AND METHOD FOR MOUNTING SAME

Figure 1A:
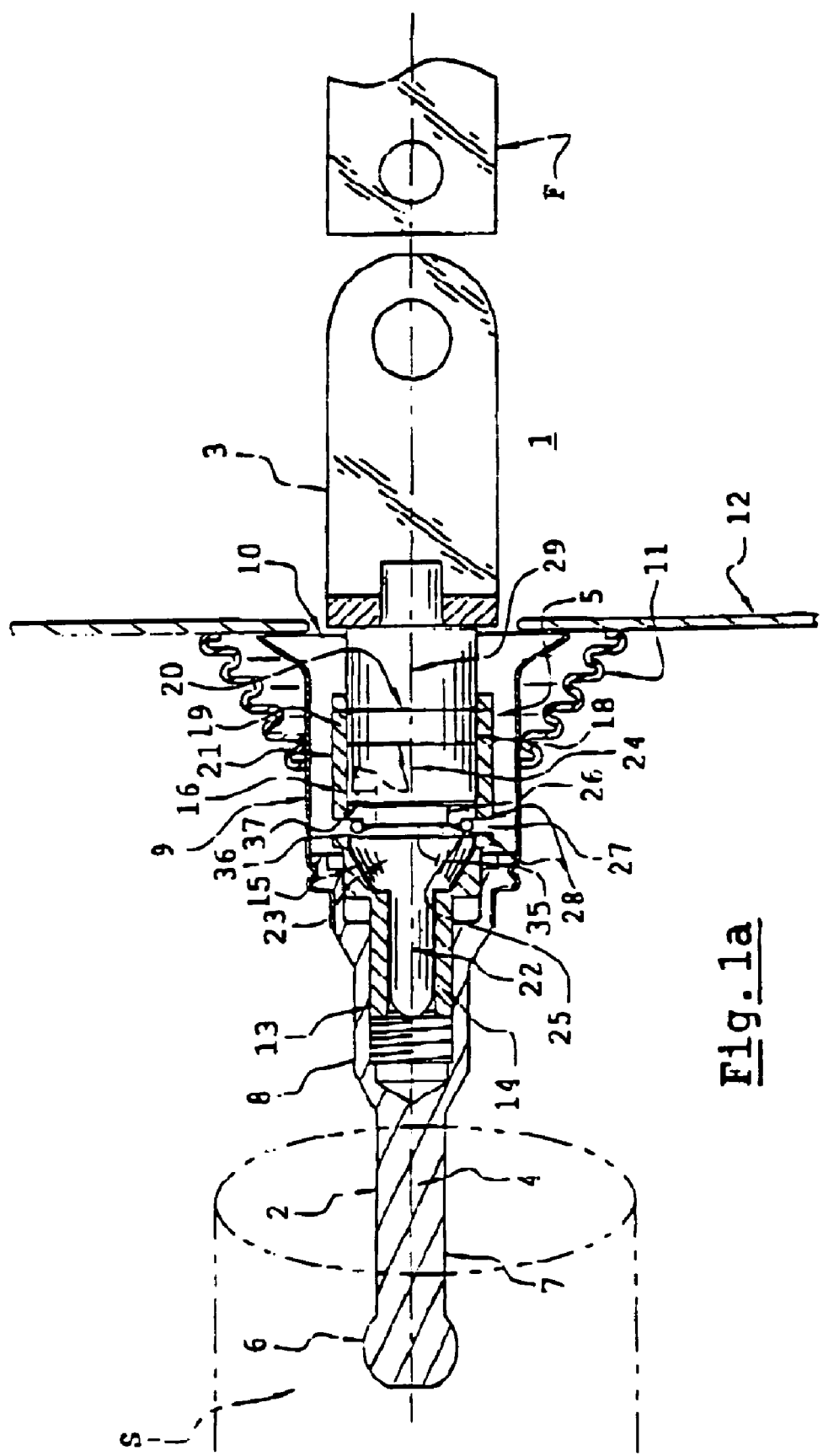

The invention relates to a pneumatic brake booster equipped with a control rod. The invention also relates to a method for mounting this booster. The purpose of the invention is to make such a pneumatic booster situated in the engine compartment of a vehicle easier to mount and to connect it via a control rod to a brake pedal situated in the cabin of a vehicle.

A pneumatic booster is a casing made of sheet metal, generally pressed, mounted on a bulkhead between a brake pedal and a master cylinder of a hydraulic brake circuit. A bulkhead is a rigid wall separating the engine compartment from the cabin. The brake pedal is connected to a control rod. The control rod enters the casing. While the casing is held fixed with respect to the bulkhead, the control rod moves longitudinally to its axis roughly at right angles to the bulkhead.

Because of the presence of the bulkhead, mounting the booster and mechanically connecting it to the brake pedal of the vehicle may require two operators, one holding the brake pedal on the cabin side, and the other holding the booster or the control rod on the engine compartment side. During mounting, the booster is fixed to the brake pedal by fixing, for example by a connecting pin connecting the control rod to the brake pedal, or possibly by screwing. This operation entails holding this control rod and one end of the brake pedal accurately and firmly together. Such assembly is tricky because it has to be performed while the two parts are also being offered up on opposite sides of the bulkhead, through a small hole intended to allow just the control rod to slide.

In addition, because several elements are assembled in a system, for example the control rod with a brake pedal, play between two elements may occur. The build up of play leads not only to acoustic disturbances which are unpleasant to the driver, but also to a dead travel detrimental to an immediate braking action and poor long-term cohesion of all these elements.

To simplify and improve the mounting of the control rod to the brake pedal, the object of the invention is, first of all, to mount the booster in the engine compartment then to fix the control rod using a fixing device other than the one which corresponds to the awkward fixing with a pin. For that, the control rod is made in two portions intended to be aligned and held rigidly one inside the other. The first portion is connected to the casing of the booster. The second portion is connected to the brake pedal on the cabin side of the vehicle. The first portion has an adapter. This adapter comprises mainly an elastic engagement mechanism known as a clip made for example in the form of a spring clip. Such engagement also allows simple connection and blind mounting because of the presence of a conical guide for engagement on the first portion and because of the presence of a plunger on the second portion. The length of the plunger is such that it makes it possible to avoid loss of connection if the connection assembling the two portions is lost or broken. To prevent the reversible effect of this elastic engagement mechanism, it is anticipated that it be locked in place by a spring clip. The two arms of the spring clip are held apart in a trapezoidal circular groove of the control rod. These two portions thus nest together in a stable way, without play, one inside the other, via this immobilizing device.

Fixing clearances are thus eliminated in the invention. Indeed, the elastic attachment device comprises, on one of the faces of the circular groove, an oblique plane against which the spring clip is housed. This oblique face allows the spring clip to become wedged, eliminating play. The nesting thus becomes more rigid.

The subject of the invention is therefore a pneumatic brake booster comprising
  a control rod, characterized in that the control rod comprises
    two portions which are separable and can be nested one inside the other, and
    an elastic device for immobilizing the nesting to hold the two portions rigidly one inside the other. This immobilizing is thus performed without play after mounting.

Another subject of the invention is a pneumatic brake booster comprising
  a control rod, characterized in that the control rod comprises
    a first and a second element which are separable and can be nested one inside the other, the first element being equipped with a housing to house one end of the second element,
    an elastic device for attaching the second element to the first element.

Another subject of the invention is a method for mounting a booster in a cabin of a vehicle in which the booster is fixed to a bulkhead separating an engine compartment from the cabin of this vehicle, characterized in that it comprises the following steps:
  a control rod of the booster is made in two portions intended to be held rigidly one inside the other,
  a first portion of the control rod is engaged in the booster before the booster is secured to the bulkhead,
  a second portion of the control rod is engaged in the first portion of the control rod from the cabin.

Figure 1B:
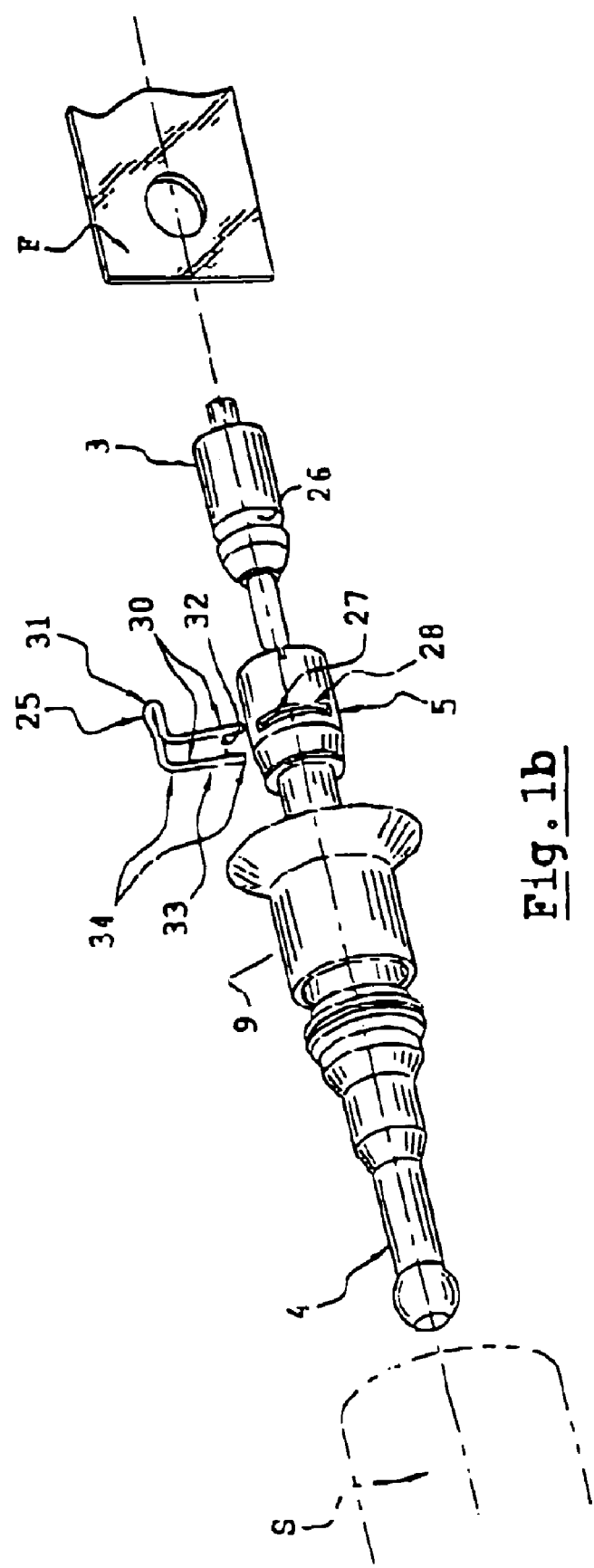

The invention will be better understood from reading the description which follows and from examining the accompanying figures. The latter are given merely by way of non-limiting indication of the invention. The figures show:
  FIG. 1*a*: A schematic depiction of the device for fixing a control rod of the invention, viewed in section;
  FIG. 1*b*: A detailed schematic depiction of the device for fixing a control rod of the invention, viewed in space.

FIG. 1*a* shows a pneumatic brake booster S (depicted very schematically) equipped with a control rod 1. According to the invention, the control rod 1 comprises two elements 2 and 3 which are separable and can be nested one inside the other. The first portion 2 is connected directly to the booster S. The second portion 3 is connected directly to a brake pedal F.

In the example, the first portion 2 comprises a ball-ended rod 4 and an adapter 5. The ball-ended rod 4 has a cylindrical shape which is conical overall. The ball-ended rod 4 has three sections. At its end in relation with the booster S it has a first section of rounded shape 6 in the form of a ball, extended by a tubular section 7 and ending in a tubular section 8 which is conical overall, the diameter of which increases in the direction of the brake pedal F. The first two sections 6 and 7 are solid while the third section 8 is hollow. A cone 9 made of sheet metal is crimped onto the widened last section 8 of the ball-ended rod 4. This cone 9 also has an opening 10 which is widened in the direction of the brake pedal F. This inlet cone 9 allows the passage of the adapter 5 and serves as a rest for a boot 11. The anti-draught boot 11 extends as far as a bulkhead 12 of the vehicle. The internal face 13 of the conical tubular section 8 of the ball-ended rod 4 has a female screwthread. The adapter 5 has a complementing male screwthread. The screwthread of the ball-ended rod 4 allows the adapter 5 to be screwed into and occupy, at some depth, a position suited to the manufacturing tolerances of vehicles and, in particular, the positions of the brake pedals F. Although the adapter 5 is also a preferred alternative form of the invention, it is entirely conceivable for it to be dispensed with and for the portion 2 of the control rod 1 to be made in one piece.

The adapter 5 has three successive sections, the sections 14, 15 and 16. The section 14 is situated at the same end as the booster S. The section 16 is situated at the same end as the brake pedal F. The two sections 14 and 16 are connected via a conical section 15. The adapter 5 thus has a cylindrical shape which externally is conical overall, matching the hollow shape of the conical tubular section 8 of the first portion 2 of the control rod 1. The shape of the adapter 5 is such that it can thus be nested by screwing of the section 14 into the conical section 8 of the ball-ended rod 4. The adapter 5 is hollow. At the location of the section 16, an inside diameter 17 of the adapter 5 delimits an internal face 18 of a wall 19 of the adapter 5, and an outside diameter 20 delimits its external face 21. These two diameters 17 and 20 change along the length of the adapter with the overall conical cylindrical shape of the adapter 5. The section 14 is tubular and hollow and has the smallest internal diameter towards the booster S. The external face 21 of the section 14 has screwthreads allowing the adapter 5 to be screwed into the conical tubular section 8-of the ball-ended rod 4. To maintain this connection without the risk of unscrewing, the adapter 5, once screwed in, is bonded into the tubular section 8. The adhesive used is, for example, of the thread lock type, particularly of the dry-setting type, possibly a cyanoacrylate adhesive.

The second portion 3 of the control rod 1 has three solid successive sections, the sections 22, 23 and 24.

The section 22 is situated on the same side as the booster S. The section 24 is situated on the same side as the brake pedal F. The two sections 22 and 24 are joined together by a conical section 23. The second portion 3 of the control rod 1 also has an overall conical external cylindrical shape matching the hollow shape of the adapter 5 of the first portion 2 of the control rod 1. The section 22 has an elongate shape of constant diameter known as the plunger. The plunger 22 allows the entire control rod 1 to be stabilized. The section 22 has a smaller diameter than the section 24. The section 22 is extended by the conical bit 23 then by the section 24 of elongate shape.

The rigid nesting-together of the two portions 2 and 3 entails the need for these two portions to be immobilized in a stable way. For that, the attachment device of the invention comprises an elastic attachment device. This attachment device in one example comprises a pin 25 slipped into the first portion 2 of the control rod 1 and engaged in the second portion 3 of the control rod 1. The pin 25 is produced in the form of a spring clip 25, FIG. 1*b,* fixed to the adapter 5. The means for accommodating this pin in the second part 3 is a circular groove 26 situated on the external face of the second portion 3 of the control rod 1.

The pin 25 of the attachment device is mounted on the adapter 5. To do this, FIG. 1*a* shows that the adapter 5 has, where the conical bit 15 and the section 16 meet, two transverse slots 27. These two transverse slots 27 open into the adapter 5. FIG. 1*b* shows that the transverse slots 27 on the adapter 5 are small transverse circular arcs. These small circular arcs are produced over a small distance so that they do not meet. On their edge faces they delimit two straight rims 28 perpendicular to the axis 29 of the control rod 1.

The spring clip 25 is a flexible and supple rod bent into two at its middle and forms two arms 30 connected by a loop 31. The two arms 30 are parallel. The spring clip 25 is also folded at 90°, about one-third of the way along its length, at the location of the loop 31, into a plane perpendicular to the plane containing the two parallel arms. The gap 32 separating the two arms 30 in an middle portion 33 at the middle of the arms is smaller than the inside diameter 17 of the adapter 5 in its section 61 and in the bottom of the groove 26 of the section 24 of the second portion 3 of the control rod 1. The length of the two arms 30 of the spring clip 25 has to be at least as great as the outside diameter 20 of the adapter 5 in its section 16.

When the pin 25 is inserted in the slots 27, the ends 35 of the arms 30 rest against one of the two rims 28 of the slots 27 on the same side as the booster S, whereas the middle portion 33 of this pin 25 lies in the gap delimited by the internal wall 18 of the adapter 5 in its widest part 16. At the location of this middle portion 33 when it is in the slots 27, the distance between the two arms 30 of the spring clip 25 is slightly greater than the gap 32. This greater distance 35 is, however, smaller than the inside diameter 17 of the adapter 6 in its portion 16 and in the bottom of the groove 26. This distance 35 results from the forced extending of the arms 30 upon their insertion into the slots 27. Because of the suppleness and flexibility of the bent rod 25, the arms 30 thus contract elastically, engaging in the adapter 5 at the two slots 27. As a result, the arms 30 are held in extension in the trapezoidal groove 26.

The bending of the spring clip 25 has the effect of the cone 9 being able to maintain the position of the bent-over end comprising the loop 31 of the spring clip 25 once this clip is engaged in the slots 27.

The pin 25 of the section 16 of the adapter 5 allows the second portion 3 of the control rod 1 to nest elastically. The elastic means for accommodating the pin 25 in the second part 3 is the circular groove 26 situated on the section 24 of the second portion 3 of the control rod 1. This groove 26 is situated between the conical section 23 and the tubular section 24, at the start of this tubular section 24. This groove 26 has two rims 36 and 37. As a preference, the profile of the groove is trapezoidal. The rim 36 on the same side of the booster S has a bearing face inclined towards the booster S with respect to the normal to this control rod 1. The outer rim 37 is perpendicular to the axis 29 of the control rod 1.

In this position, the two arms 30 allow the connection to be kept-free of play. Indeed, if the conical section 23 were to engage further into the adapter 5, the inclined edge 36 would shift toward the ball-ended rod 4 and the arms 30 would tighten around the axis 29, automatically taking up the play which may have allowed the forward movement of the conical section 23.

Thus, when the second portion 3 of the control rod 1 is nested in the first portion 2, the plunger 22 of the second portion 3 is directed in the space delimited by the inlet cone 10 of the first portion 2 and is inserted in the portion 16 of the adapter 5. The length of the plunger 22 and the widened opening 10 of the cone 9 allow blind mounting of the elastic attachment device. The length of the plunger 22 is also defined in such a way as to maintain, in the event of the fixing breaking, the link with the portion 2 connected directly to the booster S. As a result, the nesting portions 2 and 3 have nesting depths such that these two portions do not become detached if the fixing of the control rod 1 breaks. At the same time, the section 24 slides along the internal face 18 of the wall 19 of the adapter 5. The conical part 23 butts against the pin 25 and forces the arms 30 of the spring clip 25 apart until these arms close back into the groove 26. Indeed, as indicated before, the arms 30 undergo a separating extension when they are housed in the slots 27, and also at the time of the nesting when they are parted by the conical portion 23 of the second portion 3 of the control rod 1. The wall 19 of the adapter 5 has to be at least as wide as the distance needed for separating the two arms 30 of the spring clip 25 at the moment of the passage of the second portion 3. When the two arms 30 drop into the groove 26, the second portion 3 of the control rod 1 is quickly immobilized in the adapter 5.

If the edges 36 and 37 of the groove 26 were straight, the arms 30 of the spring clip 25 would butt from one edge of each groove 27 to the other because of the presence of an insertion clearance. The connection would therefore jolt on each braking or brake-releasing action. Additional clearances would therefore arise. To avoid these additional clearances, the arms 30 of the spring clip 25 are wedged between the oblique face 36 of the trapezoidal groove 26 of the second portion 3 of the control rod 1 and the straight edge 28 of the slots 27. When the driver presses on the brake pedal F, the arms 30 of the spring clip 25 are gradually pushed towards the bottom of the groove 26 and can no longer part.

As specified earlier, the arms 30 of the spring clip 25 drop into the groove 26 as the section 23 of the control rod 1 passes. The closing-up of the arms 30 towards the axis 29 of the control rod 1 is halted by the pushed-in position of the section 23 in the section 15 and by the straight edge 28 of the slots 27. The separation of the arms 30 in the opposite direction is limited by friction forces. The friction forces are the result of the arms 30 of the spring clip 25 bearing against the oblique face 36 of the groove 26. It is these friction forces which lessen play. These friction forces are proportional to the degree of inclination of the oblique face 36 of the groove 26 and by the straight edge 28 of the slots 27 on the same side as the brake pedal F. The more closely the plane of inclination of the face 36 resembles an axis perpendicular to the axis 29 of the control rod 1, the higher this friction will be. The inclination of the oblique face 36 is the result of a compromise between greater irreversibility of the mounting and greater tolerance in the compensating for play.

The invention claimed is:

1. A method for mounting a booster (S) in a cabin of a vehicle in which the booster is fixed to a bulkhead (12) separating an engine compartment from the cabin of this vehicle, characterized in that it comprises the following steps:
    a control rod (1) of the booster (S) is made in two portions (2 and 3) intended to be held rigidly one inside the other;
    a first portion (2) of the control rod (1) is engaged in the booster before the booster is secured to the bulkhead; and
    a second portion (3) of the control rod (1) is engaged in the first portion (2) of the control rod from the cabin.

2. The method according to claim 1, characterized in that it comprises a step in which
    the second portion (3) of the control rod is fixed to a brake pedal in the cabin beforehand.

3. A pneumatic brake booster (S) comprising:
    a control rod (1), characterized by a control rod having a first element (2) and a second element (3) that are separable and nested one inside the other with the first element being equipped with a housing to house one end of the second element, said first element (2) is defined by a ball-ended rod (4) that extends from a hollow cylinder section having an inlet cone (9) for accommodating an adapter (5) defined by a overall cylinder member and an elastic device for attaching the second element (3) to the first element (2), said elastic device being defined by a flexible quick-connecting spring clip (25) having a rod bent in two forming a loop and folded at 90° one-third of the way from the formed loop.

4. The booster (S) according to claim 3, characterized in that said adapter (5) includes means defined by two transverse slots (27) for accommodating the flexible spring clip (25).

5. The booster (S) according to claim 4, characterized in that the spring clip (25) is housed said two transverse slots (27) of adapter (5).

6. The booster (S) according to claim 3, characterized in that the adapter (5) is screwed and/or bonded in an adjustable position into the ball-ended rod (4).

7. The booster (S) according to claim 6, characterized in that the second element (3) of the control rod (1) has a trapezoidal groove (26) with a bearing face (36) for receiving the elastic device, said groove (26) being is inclined to the normal axis of the control rod (1).

8. The booster (S) according to claim 7, characterized in that a connection between the said first (2) and second (3) elements is a play-free connection after mounting spring clip (25) in the trapezoidal groove (26) in the control rod (1).

9. The booster (S) according to claim 8, characterized in that the first element (20 and the second element (3) each have conical portions to allow blind mounting.

10. The booster (S) according to claim 9, characterized in that the second element (3) extends into the first element (2) a distance such that they do not become detached if the attachment of the control rod (1) breaks.

11. The booster (S) according to claim 10, characterized in that the elastic device comprises means for resisting the pulling-out of the first (2) and second (3) elements of the control rod (1).

12. A pneumatic brake booster (S) comprising:
    a control rod (1), characterized by a control rod having a first element (2) and a second element (3) that are separable and nested one inside the other with the first element being equipped with a housing to house one end of the second element, said first element (2) being defined by a first portion having a ball-ended rod (4) that extends from a hollow conical section with an inlet cone (9) for accommodating a cylindrical adapter (5) that is hollow with two transverse slots (27), said second element (3) having a cylindrical body with a groove (26) thereon and an attachment device for attaching the first element (2) to the second element (3) by way of the adapter (5) to resisting the pulling-out of the second element (3) from the first element (2), said attachment device being defined by a spring clip (25) that are located in the transverse slots (27) and groove (26) to join the second element (3) to the first element (2).

* * * * *